United States Patent
Oh et al.

(10) Patent No.: US 10,207,585 B2
(45) Date of Patent: Feb. 19, 2019

(54) INPUT APPARATUS, METHOD OF INPUTTING COMMAND AND VEHICLE EQUIPPED WITH THE INPUT APPARATUS

(71) Applicant: Hyundai Motor Company, Seoul (KR)

(72) Inventors: Jong Min Oh, Ulsan (KR); Gi Beom Hong, Gyeonggi-Do (KR); Jung Sang Min, Seoul (KR)

(73) Assignee: Hyundai Motor Company, Seoul (KR)

( * ) Notice: Subject to any disclaimer, the term of this patent is extended or adjusted under 35 U.S.C. 154(b) by 100 days.

(21) Appl. No.: 14/483,728

(22) Filed: Sep. 11, 2014

(65) Prior Publication Data

US 2015/0210164 A1     Jul. 30, 2015

(30) Foreign Application Priority Data

Dec. 19, 2013   (KR) ........................ 10-2013-0159145

(51) Int. Cl.
*B60K 37/06*      (2006.01)
*B60K 35/00*      (2006.01)
*G06F 3/0354*     (2013.01)

(52) U.S. Cl.
CPC .............. *B60K 37/06* (2013.01); *B60K 35/00* (2013.01); *G06F 3/03548* (2013.01); *B60K 2350/104* (2013.01); *B60K 2350/1032* (2013.01); *B60K 2350/1036* (2013.01)

(58) Field of Classification Search
CPC .. B60K 37/06; B60K 35/00; B60K 2350/104; B60K 2350/1036; B60K 2350/1032; B60K 2350/1024; B60K 2350/1028; G06F 3/033; G06F 3/03541; G06F 3/03548; G06F 3/03549; G06F 3/0354; G06F 3/0362; G06F 3/0416; G06F 3/0412; G06F 3/0202
See application file for complete search history.

(56) References Cited

U.S. PATENT DOCUMENTS

| | | | | |
|---|---|---|---|---|
| 6,459,169 | B1 * | 10/2002 | Onodera | G05G 9/047 180/315 |
| 2003/0128103 | A1 * | 7/2003 | Fitzpatrick | B60K 35/00 340/425.5 |
| 2004/0233186 | A1 * | 11/2004 | Kobayashi | B60K 35/00 345/204 |

(Continued)

FOREIGN PATENT DOCUMENTS

| | | |
|---|---|---|
| JP | 2010-076495 A | 4/2010 |
| JP | 2013-220736 A | 10/2013 |

(Continued)

*Primary Examiner* — Temesghen Ghebretinsae
*Assistant Examiner* — Ivelisse Martinez Quiles
(74) *Attorney, Agent, or Firm* — Mintz Levin Cohn Ferris Glovsky and Popeo, P.C.; Peter F. Corless

(57) ABSTRACT

An input apparatus, a method of inputting a command, and a vehicle equipped with the input apparatus are provided. The input apparatus includes a base frame and a movable manipulation unit installed at the base frame to be movable to at least one selectable position of a plurality of selectable positions. Additionally, a controller is configured to select an application to be executed according to the at least one selectable position to which the movable manipulation unit has moved and operate the movable manipulation unit to execute an operation that corresponds to the selected application.

19 Claims, 17 Drawing Sheets

(56) References Cited

U.S. PATENT DOCUMENTS

| | | | |
|---|---|---|---|
| 2005/0032557 A1* | 2/2005 | Brunstrom | H04M 1/0235 455/575.1 |
| 2006/0108820 A1* | 5/2006 | Vican | B60R 11/0235 296/37.12 |
| 2009/0066474 A1* | 3/2009 | Kawachi | B60K 37/06 340/3.1 |
| 2010/0039403 A1 | 2/2010 | Schroeder | |
| 2010/0255862 A1* | 10/2010 | Mitsunaga | H04M 1/0235 345/173 |
| 2012/0243154 A1* | 9/2012 | Moriyasu | B60R 11/0229 361/679.01 |
| 2013/0009900 A1 | 1/2013 | Pryor | |
| 2014/0153168 A1* | 6/2014 | Hida | H05K 7/02 361/679.01 |
| 2014/0180537 A1* | 6/2014 | Ng | B60K 35/00 701/36 |
| 2014/0263511 A1* | 9/2014 | Clements | B60R 11/02 224/483 |
| 2014/0355235 A1* | 12/2014 | Kato | B60R 11/0235 361/809 |
| 2015/0084886 A1* | 3/2015 | Kamiyama | G06F 3/03548 345/173 |

FOREIGN PATENT DOCUMENTS

| | | |
|---|---|---|
| KR | 10-2006-0053947 A | 5/2006 |
| KR | 10/20100006423 | 1/2010 |
| KR | 101166895 | 7/2012 |
| KR | 1020130041420 | 4/2013 |

* cited by examiner ated with the input apparatus which allow a user to input various commands in a simplified manner. In addition, the present invention provides an input apparatus, a method of inputting a command, and a vehicle equipped with the input apparatus which allow the user to input commands for implementation of various functions more safely, quickly and correctly when the vehicle is traveling. Additional aspects of the invention will be set forth in part in the description which follows and, in part, will be obvious from the description, or may be learned by practice of the invention.

INPUT APPARATUS, METHOD OF INPUTTING COMMAND AND VEHICLE EQUIPPED WITH THE INPUT APPARATUS

CROSS-REFERENCE TO RELATED APPLICATION(S)

This application claims the benefit of Korean Patent Application No. 2013-0159145, filed on Dec. 19, 2013 in the Korean Intellectual Property Office, the disclosure of which is incorporated herein by reference.

BACKGROUND

1. Field

The present invention relates to an input apparatus, a method of inputting a command, and a vehicle equipped with the input apparatus.

2. Description of the Related Art

A vehicle is a type of transportation that travels along a road or rails to move transported subjects such as humans, objects or animals. Vehicles may include, for example, a three-wheeled or four-wheeled vehicle, a two-wheeled vehicle such as a motorcycle, construction equipment, a motorized bicycle, a bicycle, and a train that travels on rails. Various devices for user convenience may be installed within a vehicle and may include a radio device, a sound reproduction device, an air conditioning system, a navigation device, a multimedia device, and a wireless communication device, and the like. Such devices may provide the user with various function such as reproduction of music, photos, or a moving image, reception of terrestrial broadcasting or satellite broadcasting, provision of information about condition of the vehicle and/or information such as weather and news, provision of information about areas around a travel path, and guide of the travel path to a specific destination.

SUMMARY

An aspect of the present invention provides an input apparatus, a method of inputting a command, and a vehicle equipped with the input apparatus which allow a user to input various commands in a simplified manner. In addition, the present invention provides an input apparatus, a method of inputting a command, and a vehicle equipped with the input apparatus which allow the user to input commands for implementation of various functions more safely, quickly and correctly when the vehicle is traveling. Additional aspects of the invention will be set forth in part in the description which follows and, in part, will be obvious from the description, or may be learned by practice of the invention.

In accordance with one aspect of the present invention, an input apparatus may include a base frame, a movable manipulation unit installed at the base frame and movable to at least one selectable position of a plurality of selectable positions, and a controller configured to select an application to be executed according to the at least one selectable position to which the movable manipulation unit has moved and configured to operate the movable manipulation unit to perform an operation that corresponds to the selected application.

The application may include at least one of a navigation application, a radio application, a multimedia reproduction application, a telephone-call application, a digital media broadcasting application, an air conditioning system application and a vehicle control application. The movable manipulation unit may include a display unit configured to display different screens according to the selectable positions. The movable manipulation unit may further include a command input unit configured to output a signal that corresponds to a user manipulation.

The command input unit may include at least one of a physical button, a knob, a joystick, a lever, a trackball, a manipulation wheel, a touch sensor, a motion sensor, and an object detection sensor. The controller may be configured to analyze the signal output from the command input unit based on the selected application. The controller may further be configured to select an application with reference to predetermined settings, wherein the predefined settings may include a user setting defined. The input apparatus may further include a position determination unit configured to determine a selectable position of the plurality of selectable positions at which the movable manipulation unit is located. The movable manipulation unit may be moved manually, semi-automatically, or automatically according to a user manipulation.

The input apparatus may further include a movement command input unit configured to receive a command to move or stop the movable manipulation unit. The movement command input unit may further include at least one of a physical button, a knob, a joystick, a lever, a trackball, a manipulation wheel, a touch sensor, a motion sensor and an object detection sensor. The input apparatus may further include a rail installed on at least one of the base frame and the movable manipulation unit, and a rotating body installed on at least one of the base frame and the movable manipulation unit, the rotating body moving on the rail. The input apparatus may further include a fixing part configured to fix the movable manipulation unit to the at least one selectable position. The fixing part may include a first frame having at least one protrusion and a second frame movable relative to the first frame, the second frame having at least one groove allowing the least one protrusion to be inserted into or separated from the groove.

In accordance with another aspect of the present invention, a method of inputting a command may be implemented by an input apparatus that may include a base frame having a plurality of selectable positions and a movable manipulation unit installed at the base frame to cause the movable manipulation unit to be movable to at least one selectable position of the plurality of selectable positions. The method may include moving, by a controller, the movable manipulation unit and determining, by the controller, a selectable position to which the movable manipulation unit has moved, determining, by the controller, at least one application according to the selectable position, and the movable manipulation unit operating according to the determined application. The method may further include outputting, by the controller, a signal that corresponds to a user manipulation, analyzing, by the controller, the signal output according the determined application, and the movable manipulation unit operating according to a result of the analyzing of the signal.

In accordance with a further aspect of the present invention, a vehicle may include a base frame having a plurality of selectable positions, a movable manipulation unit installed at the base frame to allow the movable manipulation unit to be movable to at least one selectable position of the plurality of selectable positions, and a controller configured to select an application to be executed according to the at least one selectable position and to operate the movable manipulation unit to perform an operation that corresponds to the selected application. The vehicle may further include a movement command input unit configured to receive a command to move or stop the movable manipulation unit. The base frame and the movable manipulation unit may be installed at a dashboard of the vehicle and the movement command input unit may be installed on at least one of a gear box, a center fascia and a steering wheel.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
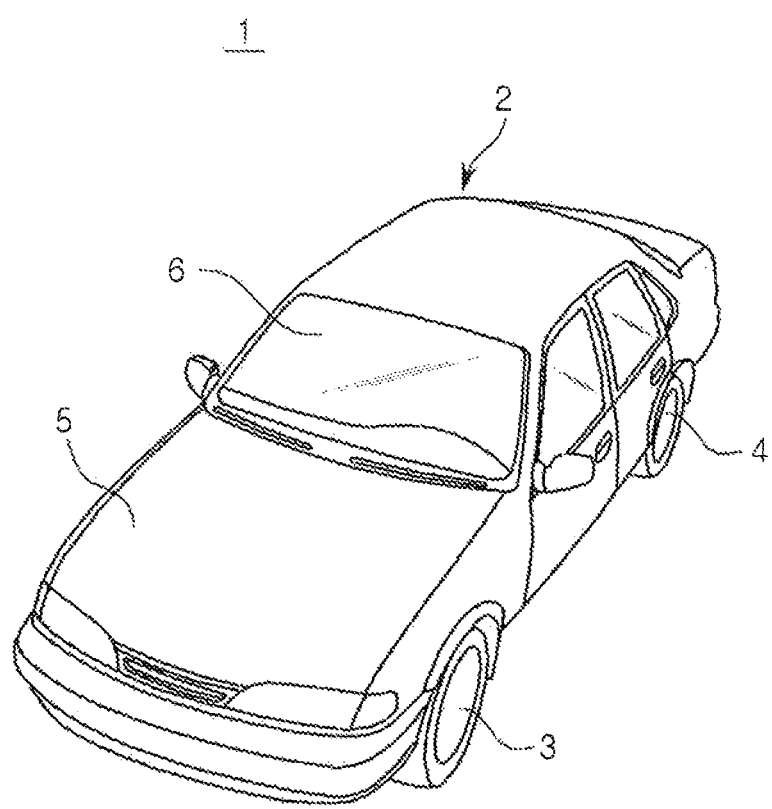
FIG. 1 is an exemplary view illustrating a vehicle according to an exemplary embodiment of the present invention.

Reference will now be made in detail to the exemplary embodiments of the present invention, examples of which are illustrated in the accompanying drawings, wherein like reference numerals refer to like elements throughout.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an input apparatus and a vehicle equipped with the input apparatus will be described with reference to FIGS. 1 to 16. While the input apparatus is illustrated as being installed at a vehicle, exemplary embodiments of the present invention are not limited thereto. The input apparatus may also be applicable to other apparatuses. For simplicity of illustration, it is assumed that the vehicle is a car. However, the vehicle is not limited to the car. The input apparatus may also be installed at a three-wheeled or four-wheeled vehicle, a two-wheeled vehicle such as a motorcycle, construction equipment, a motorized bicycle, a bicycle, and a train traveling on rails.

Figure 2:
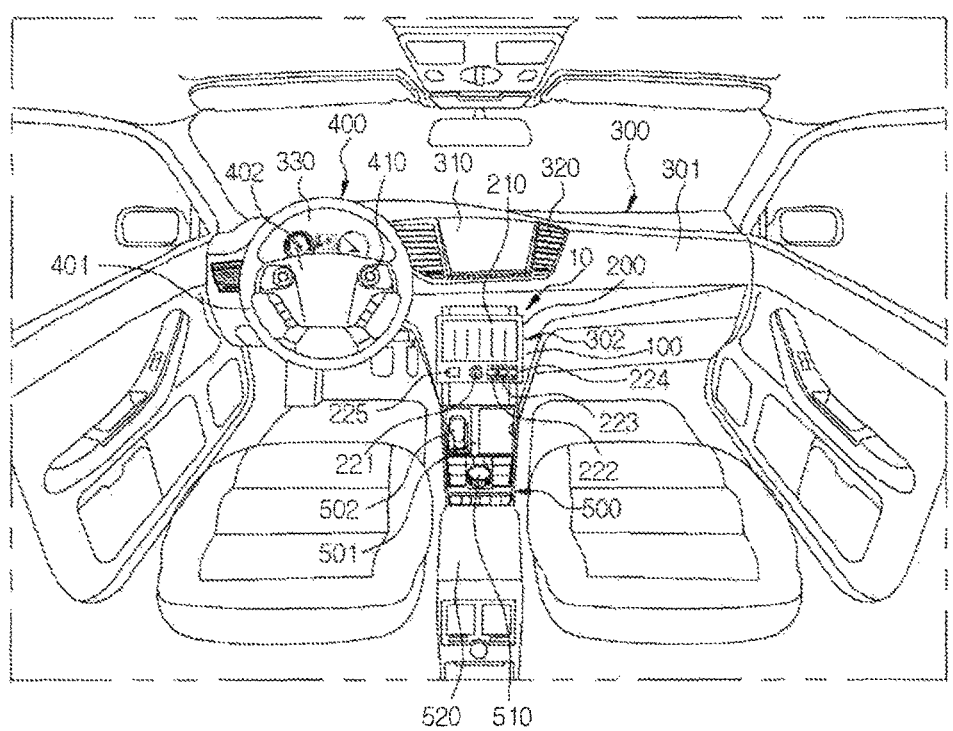
FIG. 2 is an exemplary view illustrating the internal structure of the vehicle according to one exemplary embodiment of the present invention.

FIG. 1 is an exemplary view illustrating the external appearance of a vehicle according to an exemplary embodiment. FIG. 2 is an exemplary view illustrating the internal structure of the vehicle according to one exemplary embodiment. Referring to FIGS. 1 and 2, a vehicle 1 may include a vehicle body 2 forming an external appearance of the vehicle 1, a plurality of wheels 3 and 4 configured to rotate to move the vehicle body 2 in a predetermined direction, an engine compartment 5 wherein an engine to combust gasoline or diesel to obtain power is installed, and a windshield 6 configured to provide a front view to the driver seated within the vehicle body 2.

The vehicle 1 may include a dashboard 300 disposed in the vehicle body 2 to distinguish the engine compartment 5 from the inner space of the vehicle 1. The vehicle 1 may include a display apparatus 310 configured to provide various types of information to the user, an air discharge part 320 configured to supply air into the vehicle body 2 according to operation of an air conditioning system, a gauge board 330 configured to provide various types of information related to the vehicle 1, and a steering wheel 400 operated to steer the vehicle 1. The display apparatus 310, air discharge part 320, gauge board 330, and steering wheel 400 may be installed on the dashboard 300.

The display apparatus 310 may be installed at the upper frame of the dashboard 300. The display apparatus 310 may be configured to output various types of images such as a moving image or a still image and provide the same to the driver and passengers. In addition, display apparatus 310 may be configured to display images that represent information necessary for, for example, driving. For example, the display apparatus 310 may be configured to display a map or the travel path of the vehicle 1. According to one exemplary embodiment, the display apparatus 310 may be a navigation device.

The air discharge part 320 may be configured to discharge air of a particular temperature into the vehicle body 2 according to operation of the air conditioning system to adjust the temperature inside the vehicle body 2. The air discharge part 320 may be installed at various positions on the dashboard 300. For example, the air discharge part 320 may be installed on both side surfaces of the display apparatus 310 as shown in FIG. 2. The air discharge part 320 may also be installed at both terminal ends of the upper frame of the dashboard 300. In addition, the air discharge part 320 may be installed at a center fascia 302 or a center console 520. The gauge board 330 may be configured to display traveling speed of the vehicle 1, engine revolutions per minute (RPM), or a remaining fuel level.

The steering wheel 400 may include a rim 401 gripped by the driver and a spoke 402 to connect the rim 401 to a hub of a rotational shaft for steering. The spoke 402 may be connected to a steering system of the vehicle 1 to rotate the wheels 3 and 4 in a particular direction to adjust the travel direction of the vehicle 1. According to one exemplary embodiment, the spoke 402 may be provided with a movement command input unit 410 (alternatively referred to herein as "movement command inputter") to adjust movement of an input apparatus 10. The spoke 402 may also include various manipulation means to adjust a radio unit, a vehicle-mounted communication system and the gauge board 330.

The vehicle 1 may include a gear box 501 having a gear apparatus installed therein and a gear unit 500 including a gear stick 502 that protrudes outward from the gear box 501. The gear stick 502 may include a gear box input unit 510 configured to receive various user commands for manipulation of various functions of the vehicle 1. The gear box input unit 510 may include at least one of a knob, a physical button, a joystick, a lever, a trackball, a manipulation wheel, a motion sensor, an object detection sensor and a touch sensor. The gear box input unit 510 may also include other various input means that may be considered by those skilled in the art. The gear box input unit 510 may be configured to perform the function of the movement command input unit 410.

The vehicle 1 may further include an input apparatus 10 installed at the center fascia 302 of the dashboard 300. The center fascia 302 represents a portion of the dashboard 300 positioned between the upper frame 301 and the gear unit 500. According to one exemplary embodiment, the input apparatus 10 may be installed at a different position on the dashboard 300 other than the upper frame 301. For example, the input apparatus 10 may be installed around a globe box of the dashboard 300 or an upper end of the dashboard 300, or may be installed at the upper surface or side surface of the console box 520. The input apparatus 10 may also be installed on one surface of the console box 520 protruding toward the back seat. In particular, a passenger seated in a rear seat of the vehicle may be able to manipulate the input apparatus 10. The input apparatus 10 may be installed at various positions other than the aforementioned positions which may be considered by those skilled in the art.

Figure 3:
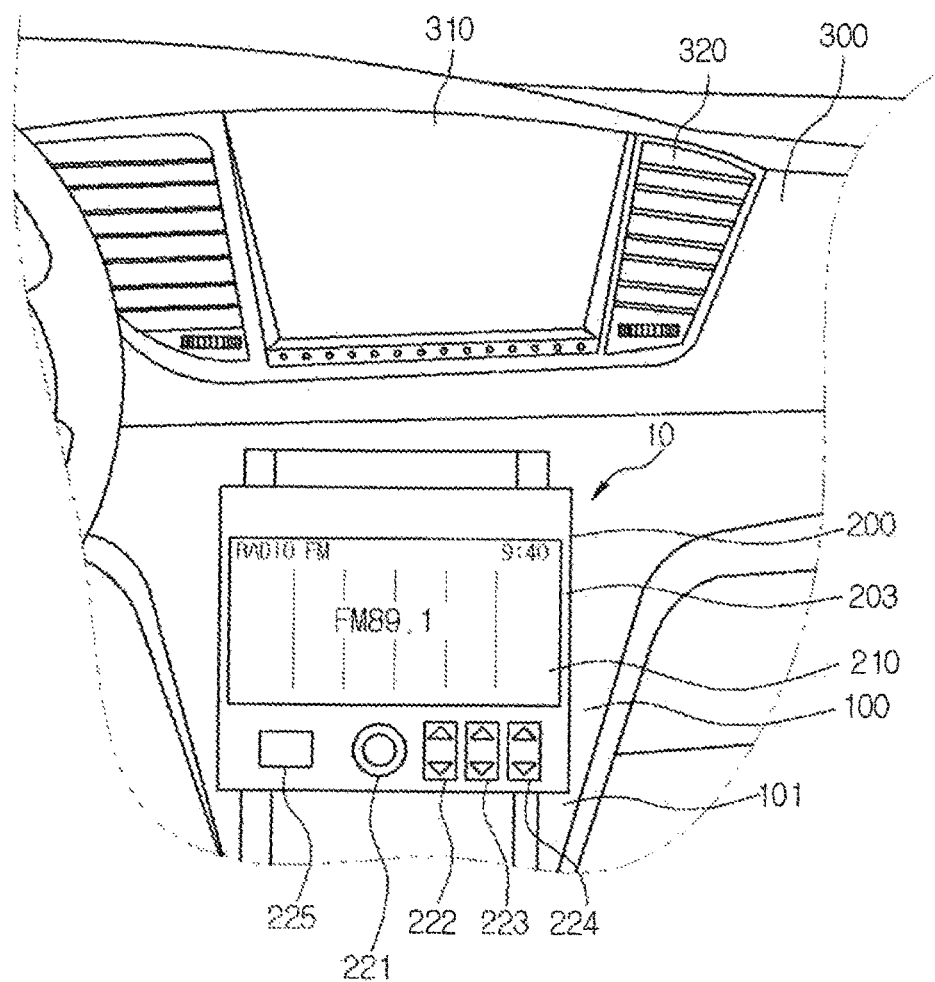
FIG. 3 is an exemplary front view illustrating an input apparatus according to one exemplary embodiment of the present invention.
Figure 4:
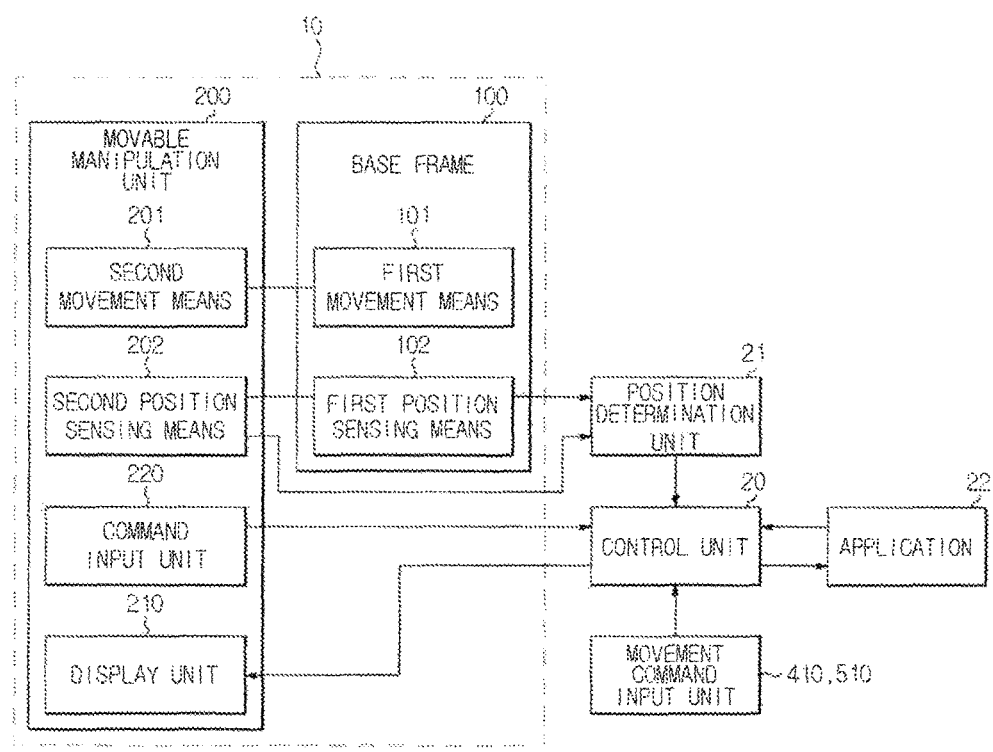
FIG. 4 is an exemplary block diagram illustrating the input apparatus according to one exemplary embodiment of the present invention.

FIG. 3 is an exemplary front view illustrating an input apparatus according to one exemplary embodiment, and FIG. 4 is an exemplary block diagram illustrating the input apparatus according to one exemplary embodiment. Referring to FIGS. 2 to 4, the input apparatus 10 may include a base frame 100 and a movable manipulation unit 200 (alternatively referred to herein as "movable manipulator").

According to one exemplary embodiment, the base frame 100 may be a portion of a dashboard housing. For example, the base frame 100 may be the housing of the center fascia 302. According to another exemplary embodiment, the base frame 100 may be a frame structure separately fabricated for the input apparatus 10. In particular, the base frame 100 may be installed on the outer surface of the center fascia 302, or may be embedded in the housing of the center fascia 302. As shown in FIG. 3, the base frame 100 may include various components such as a first movement means 101 that allows the movable manipulation unit 200 to be movably installed.

The base frame 100 may further include a first position sensing means 102 configured to detect the position of the movable manipulation unit 200. According to one exemplary embodiment, the base frame 100 may include a recessed area formed by concavely deforming a portion of the base frame 100. The inner side surfaces of the recessed area may face each other. At least one of the first movement means 101 and the first position sensing means 102 may be installed on the inner side surfaces of the recessed area. According to another exemplary embodiment, the base frame 100 may include a protruding area that protrudes from one portion of the base frame 100. In particular, at least one of the first movement means 101 and the first position sensing means 102 may be installed on the lateral surface of the protruding area. The base frame 100 may be provided with a selectable position which may be a position of the base frame 100 where the movable manipulation unit 200 stops and may be fixed. The first position sensing means 102 may be arranged at the selectable position and may be configured to sense whether the movable manipulation unit 200 stops at the selectable position and is fixed thereto.

The movable manipulation unit 200 may be movably installed at the base frame 100 and may be moved in at least two directions by components arranged at the base frame 100 and components arranged at the movable manipulation unit 200. For example, the movable manipulation unit 200 may move vertically or horizontally. In other words, the movable manipulation unit 200 may be configured to move toward the upper frame 301 of the dashboard 300 or the gear unit 500, or move toward the driver's seat or the front passenger seat. The movable manipulation unit 200 may also be configured to move in four directions of up, down, left and right. In addition, the movable manipulation unit 200 may be designed to move in a wider variety of directions.

The movable manipulation unit 200 may be configured to move to the selectable position where it may be stopped and fixed. When the movable manipulation unit 200 stops at the selectable position and is fixed, an application 22 that corresponds to the selectable position may be selected by a controller 20. Once the application 22 is selected, the movable manipulation unit 200 may be executed by the controller 20 to perform an operation that corresponds to the selected application.

As shown in FIG. 3, the movable manipulation unit 200 may include a second movement means 201 movably connected to the base frame 100. The second movement means 201 may correspond to the first movement means 101. The movable manipulation unit 200 may further include a second position sensing means 202 configured to detect the position of the movable manipulation unit 200. The second movement means 201 or the second position sensing means 202 may be installed at the movable manipulation unit housing 203. The movable manipulation unit 200 may be equipped with various components related to operation of the movable manipulation unit 200, or may include a movable manipulation unit housing 203 at which the second movement means 201 or the second position sensing means 202 may be installed.

A semiconductor chip and a printed circuit board may be installed in and fixed to the movable manipulation unit housing 203. The semiconductor chip may be installed on the printed circuit board in the movable manipulation unit housing 203. In addition, the semiconductor chip and the printed circuit board may be configured to process information or store data to allow the movable manipulation unit 200 to perform an operation that corresponds to the various applications 22. In other words, the semiconductor chip and the printed circuit board in the movable manipulation unit 200 may be configured to perform the function of the controller 20 or a position determination unit 21 (alternatively referred to herein as "position determiner").

A display unit 210 may be installed at the exterior of the movable manipulation unit housing 203 and may be configured to display various screens related to executed applications. For example, the display unit 210 may be executed by the controller 20 to display a user interface (UI) screen. The display unit 210 may further be configured to display information such as weather, news or time, or may display information related to the vehicle 1 such as remaining fuel level or speed. In addition, the display unit 210 may be configured to display various types of user desired information.

The display unit 210 may employ, for example, a plasma display panel (PDP), light emitting diodes (LEDs) including organic light emitting diodes (OLEDs), or a liquid crystal display (LCD). In addition, the display unit 210 may employ a three-dimensional display configured to display stereoscopic images. According to one exemplary embodiment, the display unit 210 may be a touchscreen. The touchscreen may include a resistive touchscreen panel or a capacitive touchscreen panel. Further, the touch screen may use ultrasound or infrared light. When the display unit 210 is a touchscreen, the display unit 210 may be configured to display a guide element to receive touch manipulation (e.g., pressure) applied to the screen. The guide element may be an image of an icon, button, or scroll. The user may touch a touch button displayed on the screen of the display unit 210 or input a touch gesture using a touch tool such as the user's hand or a touch pen to input various commands.

A command input unit 220 (alternatively referred to herein as "command inputter") may be installed at the exterior of the movable manipulation unit housing 203. The user may input various commands for various applications executed by the movable manipulation unit 200 through the command input unit 220. In addition, the user may apply various manipulations such as applying pressure to the command input unit 220 or rotating the command input unit 220. The command input unit 220 may be configured to output a signal that corresponds to the user manipulation in response to the manipulation and transfer the output signal to the controller 20.

As shown in FIG. 3, the command input unit 220 may include at least one of a knob 221, physical buttons 222 to 225, and a touch panel. The knob 221 may be rotated in at least one direction to change channels or move a focus. Herein, the focus may indicate at least one of a plurality of items where there is a plurality of selectable items. The physical buttons 222 to 225 may be configured to perform a specific function according to pressure applied by the user. The physical buttons may be direction keys 222 to 224, as shown in FIG. 3. The physical buttons 222 to 225 may be used to receive specific commands from the user, change the broadcast channel, or move the focus. A touch pad may be configured to receive a predetermined user touch gesture. The predetermined user touch gesture may be analyzed by an analysis device connected to the touch pad, e.g., the controller 20, and the controller 20 may be configured to produce a control signal according to the result of analysis. In addition, the command input unit 220 may include at least one of a joystick, a lever, a trackball, a manipulation wheel, a motion sensor and an object detection sensor.

According to one exemplary embodiment of the present invention, commands input according to manipulation of the command input unit 220 may differ from each other according to types of the applications 22 executed by the movable manipulation unit 200 which may be executed by the controller 20. According to another exemplary embodiment, the same command may be executed according to manipulation of the command input unit 220, regardless of the applications 22 executed by the movable manipulation unit 200. According to another exemplary embodiment, a part of the command input unit 220 may be configured to receive a different command based on an executed application, and the other part of the command input unit 220 may be configured to receive the same command regardless of the application being executed.

For example, commands input according to manipulation of the knob 221 and first to third buttons 222 to 224 may differ from each other based on the types of executed applications 22. More specifically, when the executed application 22 is a radio application, the first button 222 may be used to receive input of a command to adjust the volume of output sound. When the executed application 22 is a vehicle control application, the first button 222 may be used to receive input of a command to adjust the indoor temperature of the vehicle 1. Further, the command received according to manipulation of the fourth button 225 may not change regardless of the types of the application 22. For example, the fourth button 225 may be an emergency light switch used to receive input of a command to flicker the emergency light. The commands received according to manipulation of the command input unit 220 may be pre-defined by a system designer, or may be defined by the user. In addition, the commands executed according to manipulation of the command input unit 220 may be changed by the user.

Figure 5:
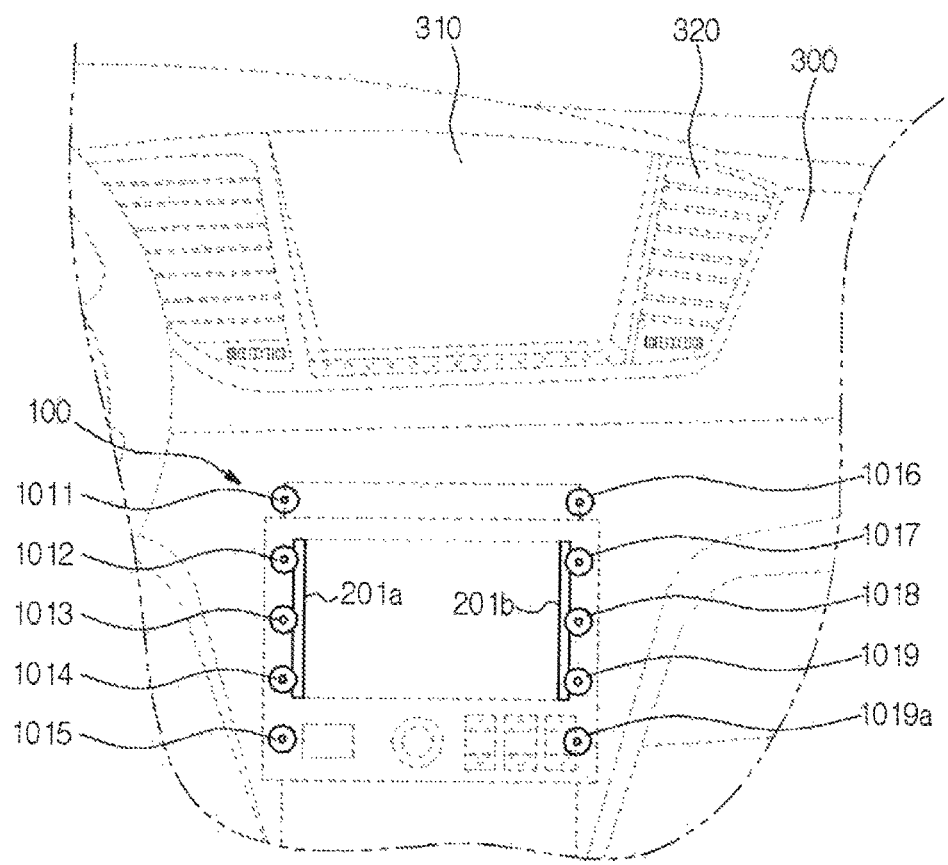
FIG. 5 is an exemplary view illustrating an input apparatus having rails installed at a movable manipulation unit and rotating bodies installed at a base frame according to one exemplary embodiment of the present invention.

Hereinafter, various examples of movably installing the movable manipulation unit 200 at the base frame 100 will be described. FIG. 5 is an exemplary view illustrating an input apparatus having rails installed at a movable manipulation unit and rotating bodies installed at a base frame according to one exemplary embodiment. Referring to FIG. 5, the base frame 100 may include two columns of first movement means 1011 to 1015 and 1016 to 1019a which are spaced apart from each other. When necessary, the base frame 100 may include one column of first movement means 1011 to 1019*a*, or may include three or more columns of first movement means 1011 to 1019*a*. The first movement means 101 of the base frame 100 may be first rotating bodies 1011 to 1019*a*.

Hereinafter, one of the two spaced columns will be defined as an eleventh column and the other one of the columns will be defined as a twelfth column. In addition, the first rotating bodies 1011 to 1015 in the eleventh column will be defined as eleventh rotating bodies, and the second rotating bodies 1016 to 1019*a* in the twelfth column will be defined as twelfth rotating bodies. The first rotating bodies 1011 to 1019*a* may be configured to rotate about predetermined axes and may be connected to a motor device (not shown) configured to generate rotational force. The motor device may be configured to generate rotational force clockwise or counterclockwise according to execution by the controller 20 to rotate the first rotating bodies 1011 to 1019*a* clockwise or counterclockwise. The outer circumferential surfaces of the first rotating bodies 1011 to 1019*a* may be provided with teeth or grooves.

The second movement means 201 of the movable manipulation unit 200 may be second rails 201*a* and 201*b*. The second rails 201*a* and 201*b* may be fixed to the movable manipulation unit housing 203 and may be in contact with the first rotating bodies 1011 to 1019*a*. When necessary, the second rails 201*a* and 201*b* may include grooves that correspond to the teeth of the first rotating bodies 1011 to 1019*a*, or may include teeth that correspond to the grooves of the first rotating bodies 1011 to 1019*a*. The second rails 201*a* and 201*b* may remain fixed to the movable manipulation unit housing 203.

When the first rotating bodies 1011 to 1019*a* rotate, the second rails 201*a* and 201*b* in contact with the first rotating bodies 1011 to 1019*a* may be moved in a predetermined direction by frictional force or by the teeth and grooves. In particular, the eleventh rotating bodies 1011 to 1015 may be configured to rotate clockwise or counterclockwise, and the twelfth rotating bodies 1016 to 1019*a* may be configured to rotate in the direction opposite to rotation of the eleventh rotating bodies 1011 to 1015. Accordingly, the two rails 201*a* and 201*b* may move in the same direction. As the two rails 201*a* and 201*b* move in a predetermined direction, the movable manipulation unit housing 203 connected to the two rails 201*a* and 201*b* may also be configured to move.

Figure 6:
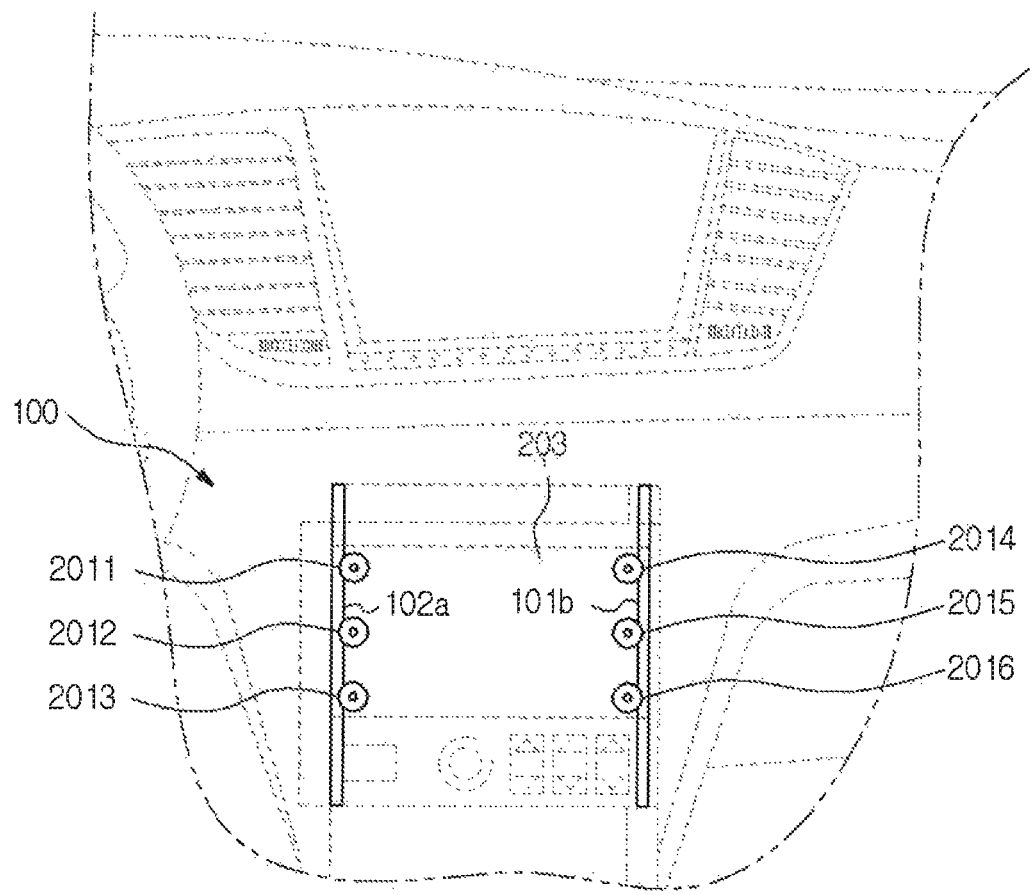
FIG. 6 is an exemplary view illustrating an input apparatus having rotating bodies installed at a movable manipulation unit and rails installed at a base frame according to one exemplary embodiment of the present invention.

FIG. 6 is an exemplary view illustrating an input apparatus having rotating bodies installed at a movable manipulation unit and rails installed at a base frame according to one exemplary embodiment. Referring to FIG. 6, the base frame 100 may include two columns of first rails 101*a* and 101*b*. Each of the first rails 101*a* and 101*b* may include teeth or grooves. The movable manipulation unit 200 may include second movement means 2011 to 2016. The second movement means 2011 to 2016 may be installed at the movable manipulation unit housing 203. As shown in FIG. 6, the second rotating bodies 2011 to 2016 may be arranged in two columns. However, arrangement of the second rotating bodies 2011 to 2016 is not limited to the exemplary embodiment illustrated in FIG. 6. The second movement means 2011 to 2016 may be arranged in one or a plurality of columns. According to one exemplary embodiment, the second movement means 2011 to 2016 may include second rotating bodies.

Hereinafter, the rotating bodies 2011 to 2013 in one column will be defined as twenty-first rotating bodies, and the rotating bodies 2014 to 2016 in the other column will be defined as twenty-second rotating bodies. The second rotating bodies 2011 to 2016 may be configured to rotate about predetermined axes and may be connected to a motor device configured to generate rotational force to rotate clockwise or counterclockwise. The outer circumferential surfaces of the second rotating bodies 2011 to 2016 may include teeth or grooves that correspond to the grooves or teeth of the first rails 101*a* and 101*b*.

When the second rotating bodies 2011 to 2016 rotate, the first rails 101*a* and 101*b* in contact with the second rotating bodies 2011 to 2016 may be moved along the first rails 101*a* and 101*b* by frictional force or by the teeth and grooves. In particular, the twenty-first rotating bodies 2011 to 2013 may be configured to rotate clockwise or counterclockwise, and the twenty-second rotating bodies 2014 to 2016 may be configured to rotate in the direction opposite to rotation of the twenty-first rotating bodies 2011 to 2013. Depending on the directions of rotation of the twenty-first rotating bodies 2011 to 2013 and the twenty-second rotating bodies 2014 to 2016, the movable manipulation unit housing 203 may be configured to move up or down (e.g., vertically).

Movement of the movable manipulation unit 200 on the base frame 100 using both rails and rotating bodies as an example has been described above with reference to FIGS. 5 and 6. However, movement of the movable manipulation unit 200 is not limited thereto. For example, the movable manipulation unit 200 may be moved by engagement between the first rotating bodies of the base frame 100 and the second rotating bodies of the movable manipulation unit 200. In particular, the rails illustrated in FIGS. 5 and 6 may be omitted. According to one exemplary embodiment, the movable manipulation unit 200 may be moved using a pneumatic cylinder or a hydraulic cylinder or using a belt or a pulley. In addition, various applicable techniques may be used by those skilled in the art to move the movable manipulation unit 200.

The movable manipulation unit 200 may be manually moved by the user, or may be semi-automatically moved by force applied by the user. When the movable manipulation unit 200 is semi-automatically movable, the movable manipulation unit 200 may include a force sensor configured to sense force applied by the user. The force sensor may also be configured to generate an electrical signal that corresponds to the sensed force, and the first rotating bodies 1011 to 1019*a* of the base frame or the second rotating bodies 2011 to 2016 of the movable manipulation unit 200 may be configured to automatically rotate based on the electrical signal output from the force sensor to move the movable manipulation unit 200. Accordingly, the user may move the movable manipulation unit 200 even without applying a substantial force. In addition, the movable manipulation unit 200 may be configured to automatically move in response to the electrical signal generated according to manipulation of the movement command input unit 410 by the user.

Figure 7:
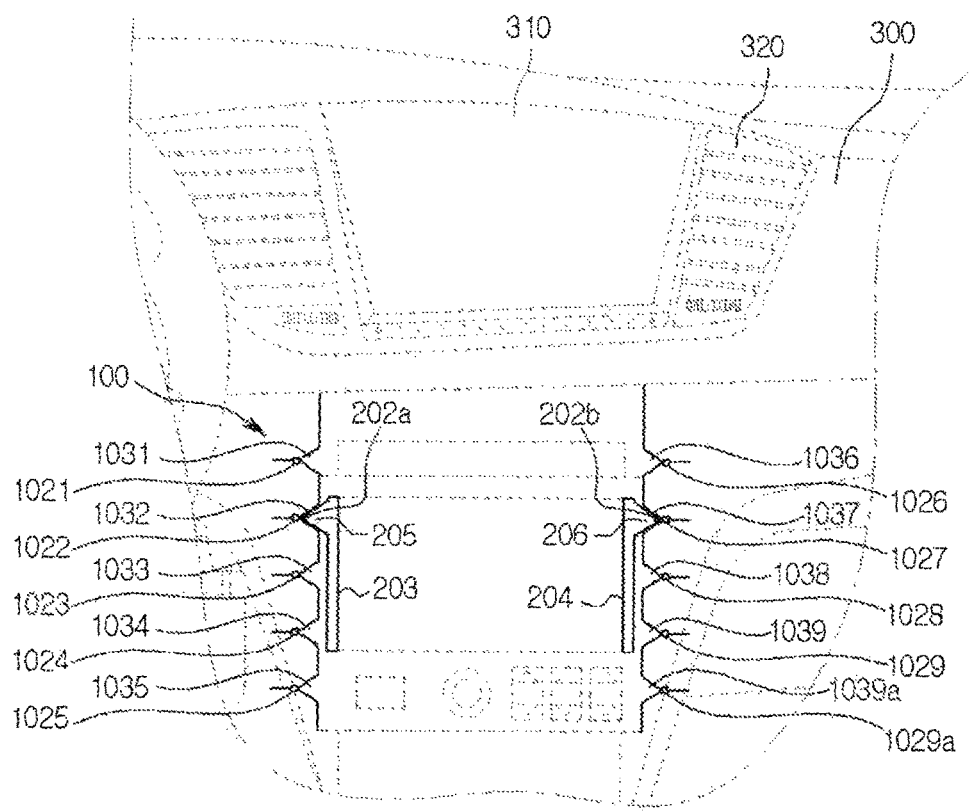
FIG. 7 is an exemplary view illustrating fixing parts of an input apparatus according to one exemplary embodiment of the present invention.
Figure 8:
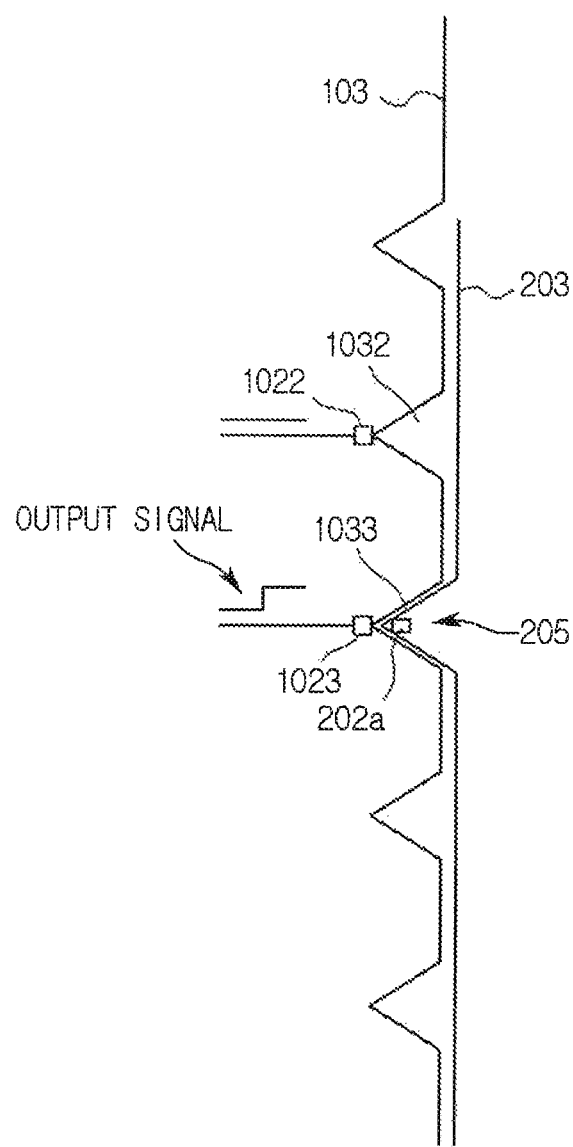
FIGS. 8 to 10 are exemplary views illustrating when a movable manipulation unit is fixed or not fixed by fixing parts of an input apparatus according to one exemplary embodiment of the present invention.
Figure 9:
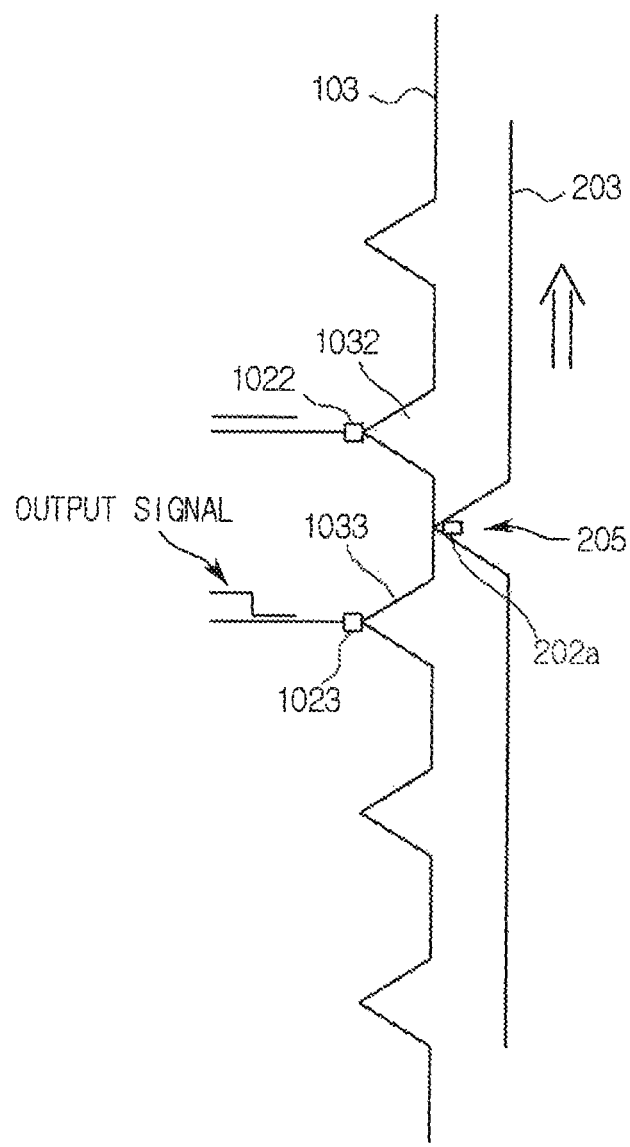
Figure 10:
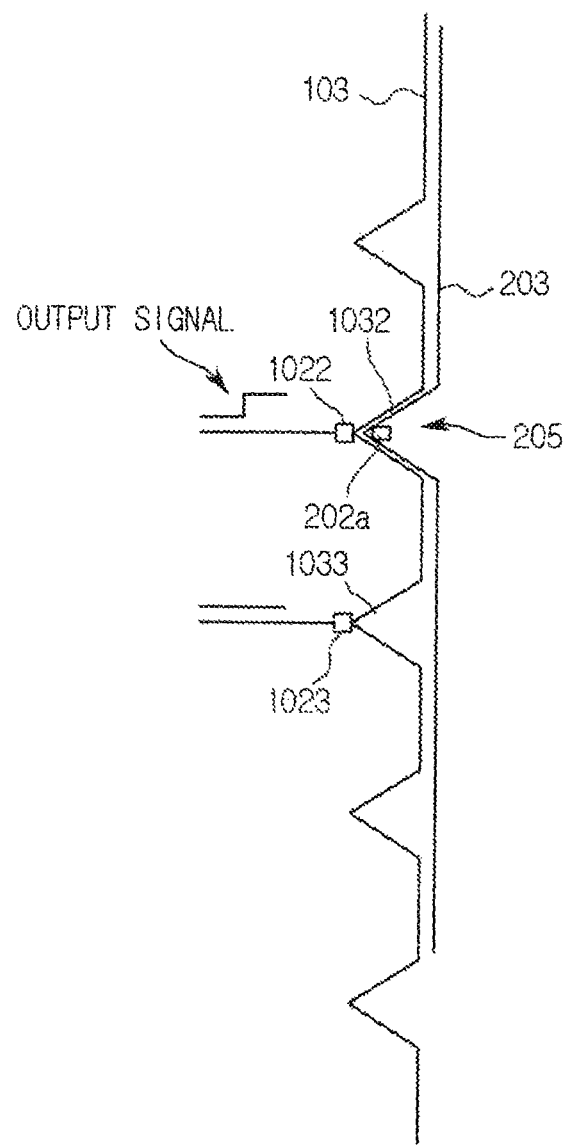

In the method of movement described above, the base frame 100 may be configured to move to at least one of a plurality of selectable positions arranged at the base frame 100. FIG. 7 is an exemplary view illustrating fixing parts (alternatively referred to herein as "fixers") of an input apparatus according to one exemplary embodiment, and FIGS. 8 to 10 are exemplary views illustrating when a movable manipulation unit is fixed or not fixed by fixing parts of an input apparatus according to one exemplary embodiment.

Referring to FIG. 7, the base frame 100 may include first fixing parts 103 and 104 configured to fix the movable manipulation unit 200 at a predetermined position. The first fixing parts 103 and 104 may include a plurality of insertion parts 1031 to 1039a. Each of the insertion parts 1031 to 1039a may represent a selectable position that corresponds to an application to be executed. The insertion parts 1031 to 1039a may include first position sensing means 1021 to 1029a configured to sense the position of the movable manipulation unit 200.

The first position sensing means 1021 to 1029a may include, for example, proximity sensors that may be configured to sense a change of a magnetic field according to approach of fixing protrusions 205 and 206 or the light output from the fixing protrusions 205 and 206. Accordingly, the proximity sensors may be configured to sense whether the fixing protrusions 205 and 206 have been inserted into the insertion parts 1031 to 1039a. The proximity sensors may also be configured to detect a change in capacitance to sense whether the fixing protrusions 205 and 206 have been inserted into the insertion parts 1031 to 1039a. In addition, various means capable of sensing whether the fixing protrusions 205 and 206 have been inserted into the insertion parts 1031 to 1039a may be used as the first position sensing means 1021 to 1029a. Further, magnets may be installed at the insertion parts 1031 to 1039a to allow the fixing protrusions 205 and 206 to be more stably inserted into the insertion parts 1031 to 1039a.

The movable manipulation unit 200 may include second fixing parts 203 and 204 that correspond to the first fixing parts 103 and 104 respectively. The second fixing parts 203 and 204 may be installed at the movable manipulation unit housing 203 and may be configured to move along with movement of the movable manipulation unit 200. The second fixing parts 203 and 204 may be formed of an elastic material. Additionally, the second fixing parts 203 and 204 may include fixing protrusions 205 and 206 which may be inserted into and fixed to at least one of the insertion parts 1031 to 1039a of the first fixing parts 103 and 104. Terminal ends of the fixing protrusions 205 and 206 may include sensed means 202a and 202b which may be sensed by the first position sensing means 1021 to 1029a. The sensed means 202a and 202b may be permanent magnets, or may be light emitting devices such as LEDs. Separate magnets may be installed at the fixing protrusions 205 and 206 to allow the fixing protrusions 205 and 206 to be more stably inserted into and fixed to the insertion parts 1031 to 1039a.

Referring to FIGS. 8 to 10, when the movable manipulation unit 200 moves along the base frame 100, the fixing protrusions 205 and 206 of the second fixing parts 203 and 204 may be inserted into the insertion parts 1031 to 1039a of the first fixing parts 103 and 104 to fix the movable manipulation unit 200 at the selectable position, or may leave the insertion parts 1031 to 1039a to allow the movable manipulation unit 200 to move.

As shown in FIG. 8, when the fixing protrusion 205 of the second fixing part 203 is inserted into a first insertion part 1033, the eleventh position sensing means 1023 provided to the first insertion part 1033 may be configured to sense the sensed means 202a and output an electrical signal that corresponds to the sensing of the sensed means 202a. The output electrical signal may include information regarding the first insertion part 1033 from which the electrical signal is output. The electrical signal output from the first insertion part 1033 may be transferred to the position determination unit 21. The position determination unit 21 may be executed by the controller 20 to determine the position of the movable manipulation unit 200 based on the output electrical signal. When the movable manipulation unit 200 moves in the upward direction in FIG. 8, the second fixing part 203 may also be configured to move as show in FIG. 9.

Thereby, the fixing protrusion 205 may leave (e.g., move out of) the first insertion part 1033. Then, the eleventh position sensing means 1023 of the first insertion part 1033 may be configured to stop sensing the sensed means 202a and thus may be configured to stop outputting the electrical signal. When the movable manipulation unit 200 moves further in the upward direction, the fixing protrusion 205 of the second fixing part 203 may reach the second insertion part 1032 and may be inserted into the second insertion part 1032 by elastic force of the second fixing part 203. When the fixing protrusion 205 is inserted, the twelfth position sensing means 1022 of the second insertion part 1032 may be configured to sense the sensed means 202a of the fixing protrusion 205 and output an electrical signal that corresponds to sensing of the sensed means 202a. As described above, the electrical signal output from the twelfth position sensing means 1022 may include information regarding the second insertion part 1032, and the position determination unit 21 may be configured to determine the position of the movable manipulation unit 200 based on the electrical signal output from the second insertion part 1032.

In the exemplary embodiment illustrated in FIGS. 7 to 10, the first fixing parts 103 and 104 may include the insertion parts 1031 to 1039a and the first position sensing means 1021 to 1029a, and the second fixing parts 203 and 204 may include the fixing protrusions 205 and 206 and the sensed means 202a and 202b. However, exemplary embodiments of the first fixing parts 103 and 104 and the second fixing parts 203 and 204 are not limited thereto. For example, unlike FIGS. 7 to 10, the first fixing parts 103 and 104 may include fixing protrusions, and the second fixing parts 203 and 204 may include insertion portions. In addition, the first fixing parts 103 and 104 may include the sensed means 202a and 202b, and the second fixing parts 203 and 204 may include the first position sensing means 1021 to 1029a.

The position determination unit 21 may be configured to determine a selectable position of a plurality of selectable positions of the base frame 100 to which the movable manipulation unit 200 has moved, and transfer the result of determination to the controller 20. Specifically, as shown in FIG. 4, the position determination unit 21 may be configured to receive an electrical signal output from at least one of the first position sensing means 102 and the second position sensing means 202 and determine insertion parts 1031 to 1039a into which the fixing protrusions 205 and 206 have been inserted. Then, the position determination unit 21 may be configured to determine the position of the movable manipulation unit 200. Thereby, the movable manipulation unit 200 may be executed by the controller 20 to determine a selectable position to which the movable manipulation unit 200 has moved. The result of determination may be transferred to the controller 20, as shown in FIG. 4.

The controller 20 may be configured to select an application 22 to be executed based on the selectable position where the movable manipulation unit 200 is located, and output a control signal related to the selected application 22. The output control signal may be transferred to the display unit 210. According to one exemplary embodiment, the controller 20 may also be configured to select an application based on the pre-defined settings. The pre-defined settings may include selectable positions and settings for applications that correspond to the selectable positions. The pre-defined settings may be defined by the system designer or by the user.

An application corresponding to the position of the movable manipulation unit 200 may be selected with reference to an application database. Depending on the position of the movable manipulation unit 200, the application to be executed may be one determined by the system designer or may be one selected by the user. In addition, when necessary, an application to be executed may be changed according to the position of the movable manipulation unit 200.

The controller 20 may further be configured to analyze the signal output from the command input unit 220 and produce a corresponding control signal. In this particular, the controller 20 may be configured to produce a different control command according to an executed application. For example, when the executed application is a radio application, the controller 20 may be configured to produce a control command to change the radio channel frequency according to the signal output from the knob 221 of the command input unit 220. When the executed application is a multimedia reproduction application, the controller 20 may be configured to produce a control command to change the reproduced music file according to the signal output from the knob 221.

The controller 20 and the position determination unit 21 may be implemented by software executed by one or multiple processors. The one or multiple processors may include a printed circuit board and one or more semiconductor chips positioned on the printed circuit board. The printed circuit board and the semiconductor chips may be installed in the x103 or in the dashboard 300. However, the location where the printed circuit board and the semiconductor chips are installed are not limited thereto. The printed circuit board and the semiconductor chips may be installed at various locations that may be considered by those skilled in the art. According to one exemplary embodiment, the controller 20 and the position determination unit 21 may be implemented by software installed on an electronic controller (ECU) adapted to execute various operations of the vehicle 1.

The application 22 may represent a single program or a group of programs executed according to an instruction from the controller 20. The application 22 may be a navigation application to perform navigation such as guide of a path, a radio application to output received radio broadcasting, a multimedia reproduction application to reproduce multimedia content such as sound, a moving image and a still image, a telephone-call application to perform telephone calling, an air conditioning system application to provide information regarding an air conditioning system and operate and adjust the air conditioning system, a digital media broadcasting application to output digital media broadcasting, an information display application to display various types of information, or a vehicle control application to execute various functions of a vehicle. The application 22 may be stored and installed in a semiconductor memory device or a disc memory device. The vehicle 1 may further include a database for the application 22 to allow the controller 20 to determine and select the application 22.

Figure 11:
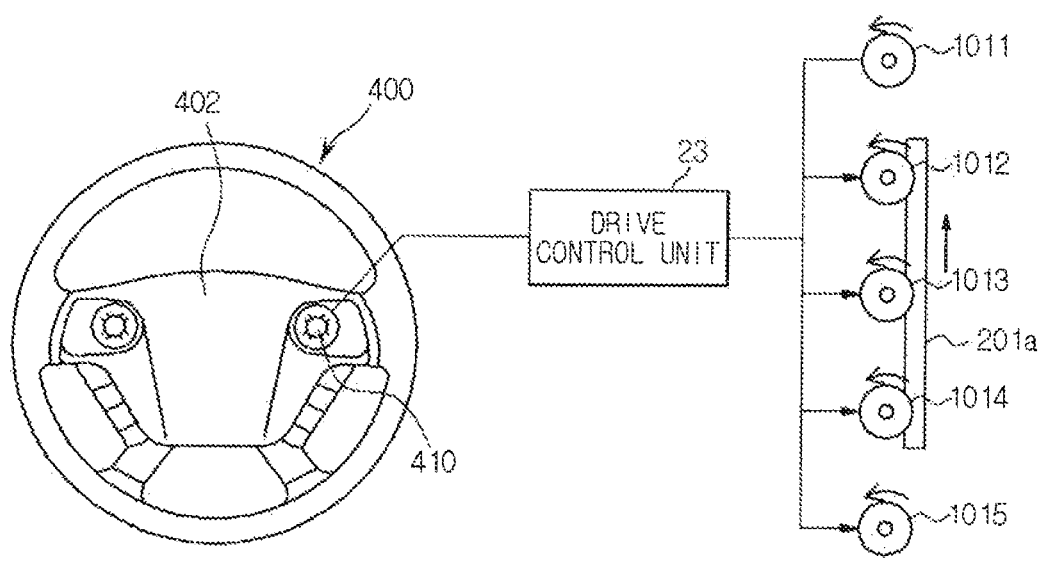
FIG. 11 is an exemplary view illustrating an input apparatus which moves a movable manipulation unit through a movement command input unit according to one exemplary embodiment of the present invention.

FIG. 11 is an exemplary view illustrating an input apparatus which moves a movable manipulation unit through a movement command input unit according to one exemplary embodiment. Referring to FIG. 11, the base frame 100 may be configured to move to at least one of a plurality of selectable positions according to manipulation of the movement command input unit 410. According to one exemplary embodiment, the movement command input unit 410 may be provided to the rim 401 of the steering wheel 400. According to another exemplary embodiment, the movement command input unit 410 may be provided to the gear box 501, the center fascia 302, or the console box 520. Further, one movement command input unit 410 may be installed within the vehicle, or a plurality of movement command input units 410 may be installed within the vehicle. The movement command input unit 410 may be configured to receive a movement direction of the movable manipulation unit 200 of the input apparatus 10 from the user. The movement command input unit 410 may include a physical button to receive an input of the movement direction or according to pressure applied by the user or a touch pad to receive an input of the movement direction according to the user's touch gesture.

In addition, the movement command input unit 410 may include a trackball or a knob. When the user manipulates the movement command input unit 410, the movement command input unit 410 may be configured to output an electrical signal that corresponds to user manipulation of the movement command input unit 410 and transfer the electrical signal to the drive controller 23. The drive controller 23 may be configured to receive the output electrical signal and produce a control command that corresponds to the received electrical signal. and the electrical signal may then be transferred to the first rotating bodies 1011 to 1019a or the second rotating bodies 2011 to 2016. The first rotating bodies 1011 to 1019a or the second rotating bodies 2011 to 2016 may be driven according to the control command to move the movable manipulation unit 200. The control command may include information regarding a selectable position which may be a target position to which the movable manipulation unit 200 may be moved.

Hereinafter, various exemplary embodiments related to an application 22 selected by the movable manipulation unit 200 according to selectable positions will be described with reference to FIGS. 12 to 16. In particular, FIGS. 12 to 16 are exemplary views illustrating displaying a user interface (UI) related to the application 22 on the display unit 210 of the movable manipulation unit 200 at selectable positions according to various exemplary embodiments of the present invention.

Figure 12:
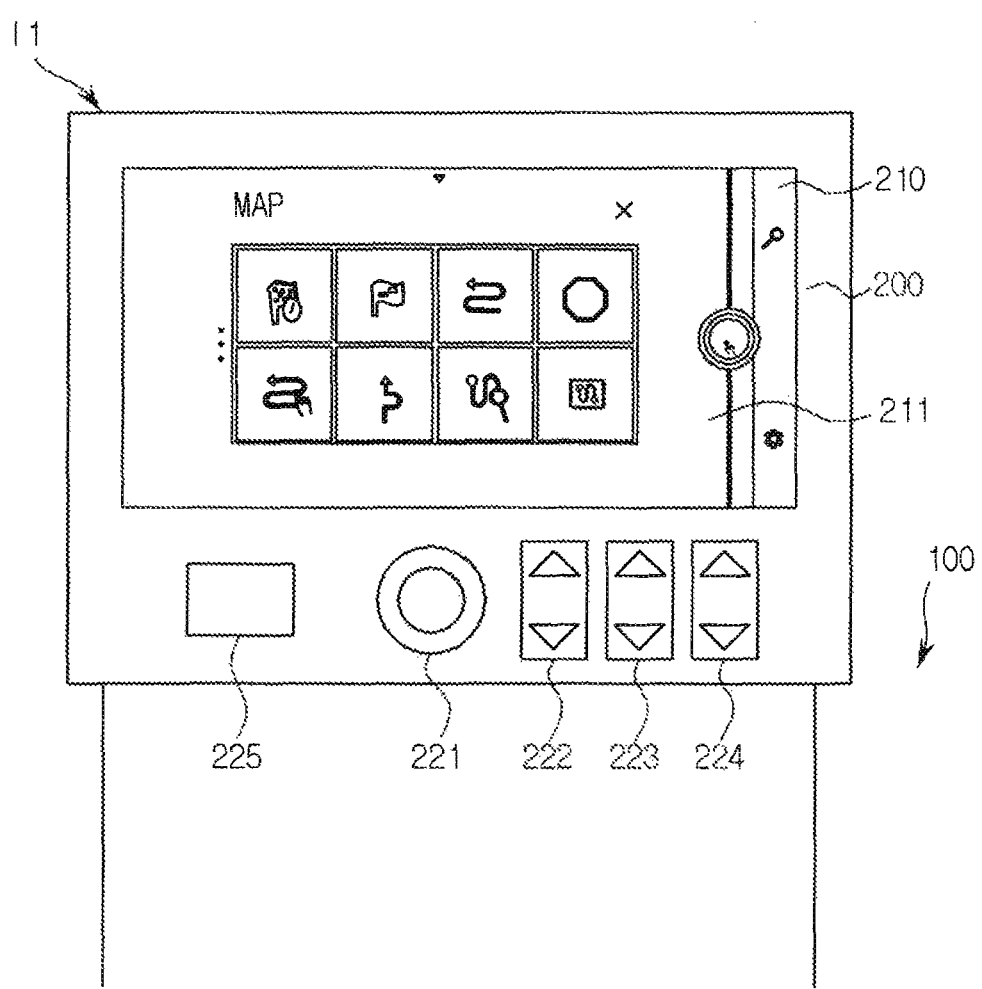
FIGS. 12 to 16 are exemplary views illustrating operation of a movable manipulation unit according to various exemplary embodiments of the present invention.

Referring to FIG. 12, the movable manipulation unit 200 may be positioned at a first selectable position I1 by being direction manipulated by the user or according to manipulation of the movement command input unit 410 by the user. Once the movable manipulation unit 200 is positioned at the first selectable position I1, the first position sensing means 102 or the second position sensing means 202 may be configured to output an electrical signal and the position determination unit 21 may be configured to determine that the movable manipulation unit 200 is located at the first selectable position I1 and transfer the result of determination to the controller 20. The controller 20 may be configured to read the database, and then access and execute an application that corresponds to the first selectable position I1, e.g., a navigation application. Then, the movable manipulation unit 200 may be configured to execute operation related to the navigation application. For example, the movable manipulation unit 200 may be configured to display a screen 211 for navigation manipulation on the display unit 210. When necessary, the display unit 210 may be configured to display a map or a travel path of the vehicle. In addition, the command input unit 221 to 225 of the movable manipulation unit 200 may be set to receive inputs of various commands for manipulation of the navigation program.

Figure 13:
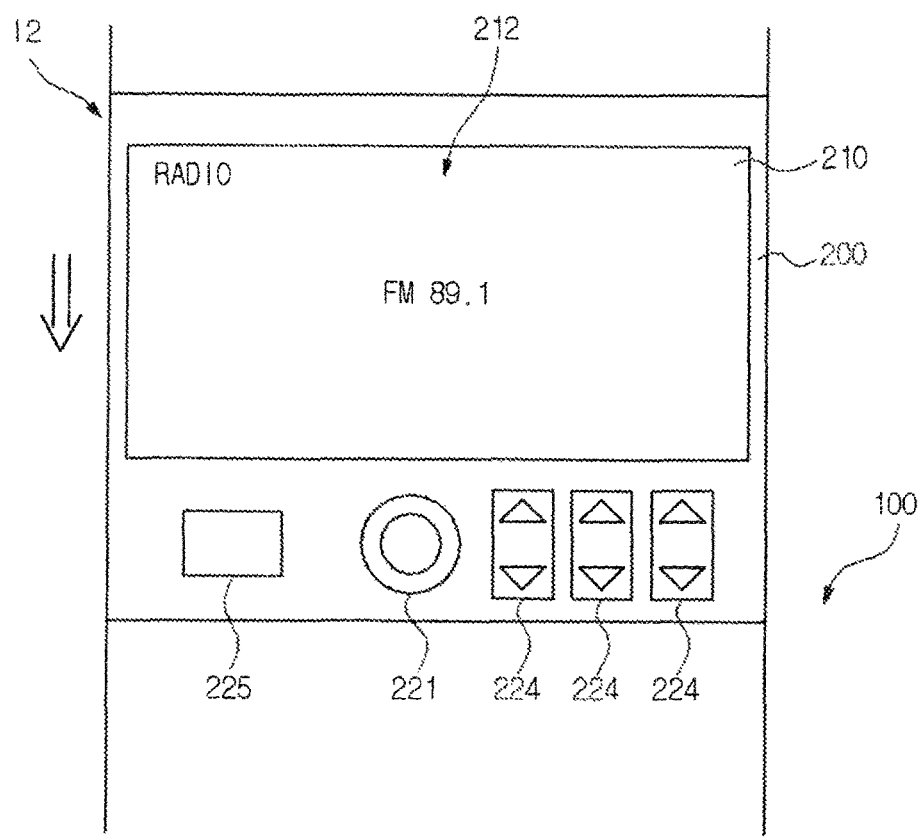

Referring to FIG. 13, the movable manipulation unit 200 may be configured to move to the first selectable position I1 or second selectable position I2 by being directly manipulated by the user or according to manipulation of the movement command input unit 410 by the user. As in the case described above, when the movable manipulation unit 200 is positioned at the second selectable position I2, the controller 20 may be configured to access and execute an application that corresponds to the second selectable position I2, e.g., a radio application, and the movable manipulation unit 200 may be configured to execute an operation related to the radio application. For example, the movable manipulation unit 200 may be configured to display the frequency of a radio channel currently being output (212). In addition, the movable manipulation unit 200 may be configured to display a plurality of selectable radio channels. The command input unit 221 to 225 of the movable manipulation unit 200 may be set to receive various commands to manipulate the radio application. For example, the knob 221 may receive a command to change the radio channel according to manipulation by the user. The physical buttons 222 to 224 may receive an input of a command to change the volume of output sound or to tune the radio channel.

Figure 14:
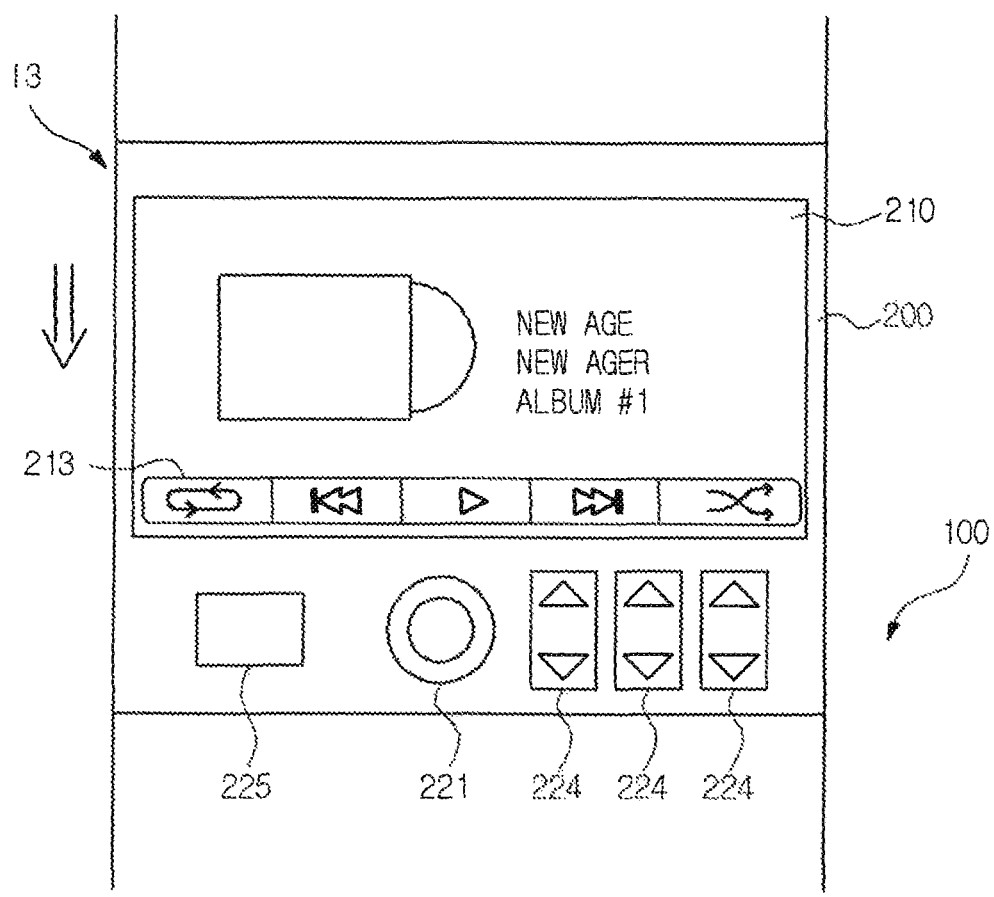

Referring to FIG. 14, the movable manipulation unit 200 may be configured to move from the second selectable position I2 to the third selectable position I3 by being directly manipulated by the user or according to manipulation of the movement command input unit 410 by the user. Then, the controller 20 may be configured to access and execute an application that corresponds to the third selectable position I3, e.g., a multimedia reproduction application, and the movable manipulation unit 200 may be configured to execute various operations such as displaying a screen related to the multimedia reproduction application or outputting corresponding sound. For example, the movable manipulation unit 200 may be configured to operate a player to reproduce a music file or a moving image file. The display unit 210 may be configured to display information related to the currently reproduced music, or display a moving image currently reproduced (213).

In addition, the display unit 210 may be configured to display selectable multimedia files selectable by the user. The display unit 210, which may be a touchscreen, may further be configured to display various buttons for playing and/or pausing a reproduced music file or moving image file, selection of another music file or moving image file, or selection of a reproduction method to receive a relevant command from the user. In the same manner as described above, the command input unit 221 to 225 of the movable manipulation unit 200 may be set to receive various commands for manipulation of the multimedia reproduction application.

Figure 15:
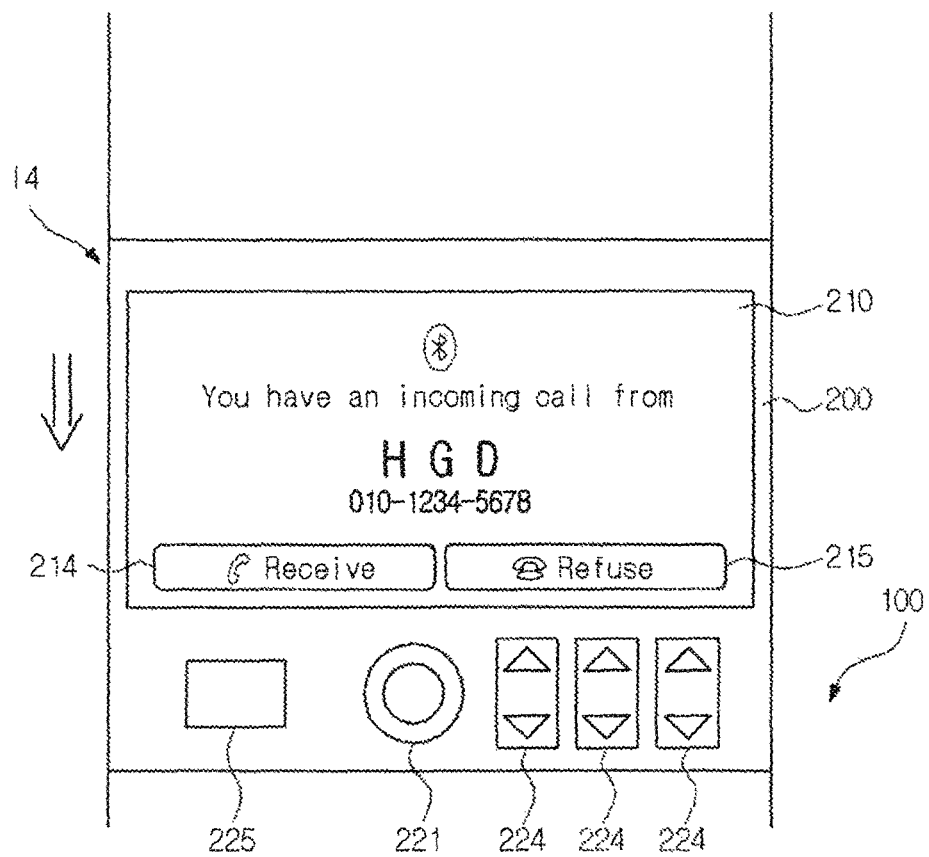

Referring to FIG. 15, the movable manipulation unit 200 may be configured to move from the third selectable position I3 to the fourth selectable position I4. Then, the controller 20 may be configured to access and execute an application that corresponds to the fourth selectable position I4, e.g., a telephone-call application. Once the telephone-call application is executed, the controller 20 may be configured to execute the telephone-call function through a separate communication terminal connected through a telephone device installed within the vehicle 1 or over a wireless communication network. Herein, the wireless communication network may employ a Bluetooth communication scheme, a ZigBee scheme, a WirelessHART scheme, a near field communication (NFC) scheme, GSM/3GPP-based schemes (GSM, HSDPA, LTE Advanced, etc.), 3GPP2-based schemes (such as CDMA), or WiMAX-based schemes (such as WiBro). The communication terminal may include a smartphone, a cellular phone, a tablet, and a personal digital assistant.

Once the telephone-call application is executed, the movable manipulation unit 200 may be configured to execute an operation related to the telephone-call application. For example, the display unit 210 of the movable manipulation unit 200 may be configured to display a telephone number input window for input of a telephone number or a search window to search for call statuses stored in the contact list. The display unit 210 may also be configured to display an incoming call window to report an incoming telephone call. When the display unit 210 is a touchscreen, button-shaped images 214 and 215 allowing selection of at least one of "Receive" and "Refuse" may be displayed on the display unit 210 to either accept the incoming telephone call or ignore the incoming telephone call. As described above, the command input unit 221 to 225 of the movable manipulation unit 200 may be configured to receive a command in a different manner over the other applications described above.

Figure 16:
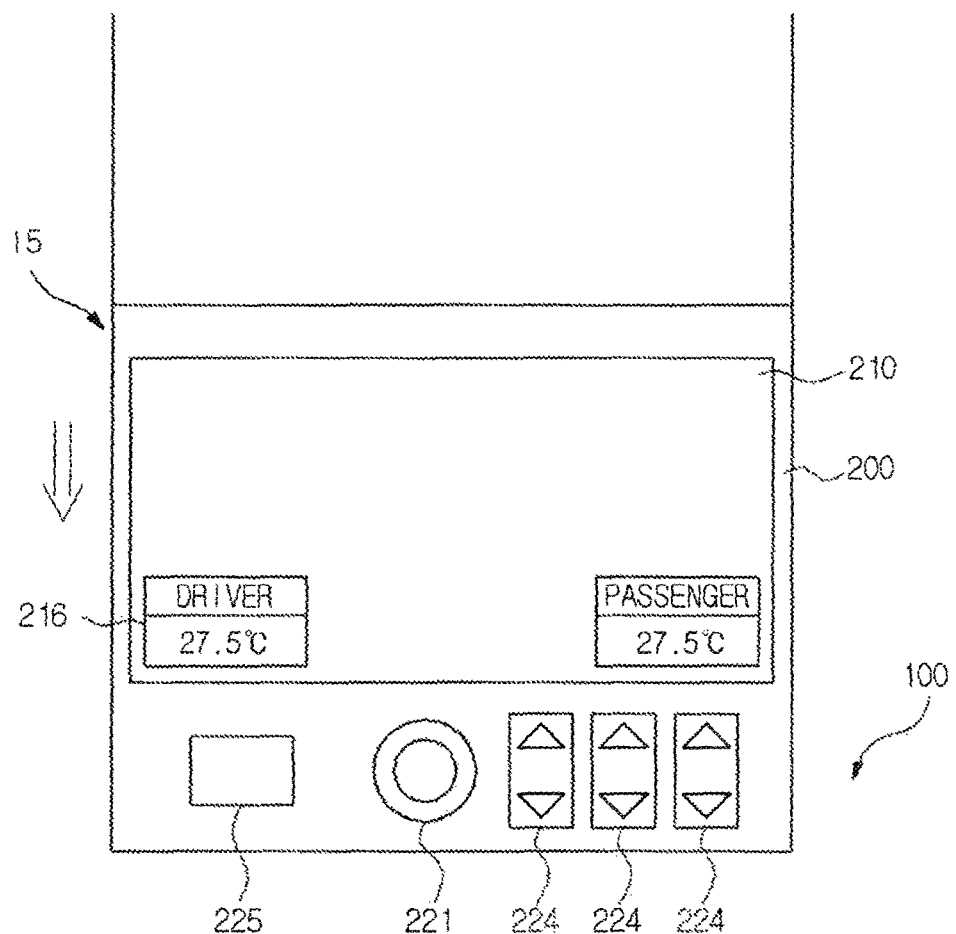

Referring to FIG. 16, the movable manipulation unit 200 may be configured to move from the fourth selectable position I4 to fifth selectable position I5 by being directly manipulated by the user or according to manipulation of the movement command input unit 410 by the user. The controller 20 may be configured to execute an application that corresponds to the fifth selectable position I5, e.g., an air conditioning system application, and the movable manipulation unit 200 may be configured to execute an operation related to the air conditioning system application. For example, the movable manipulation unit 200 may be configured to display a window 216 to output information regarding the air conditioning system. In particular, the command input unit 221 to 225 may be set to receive various commands for operation of the air conditioning system. For example, the knob 221 may be configured to receive a command to adjust the temperature in the vehicle body 2.

Figure 17:
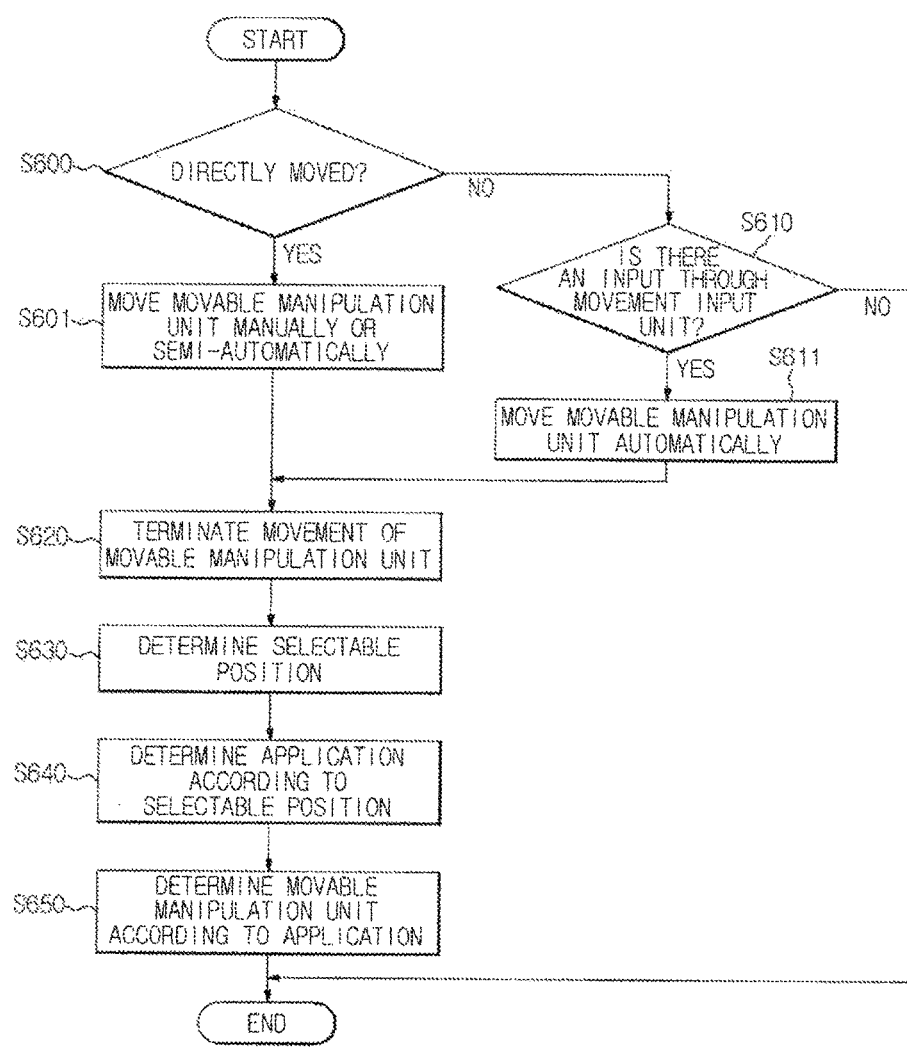
FIG. 17 is an exemplary flowchart illustrating a method of inputting a command according to one exemplary embodiment of the present invention.

Hereinafter, a method of inputting a command will be described with reference to FIG. 17. In particular, FIG. 17 is an exemplary flowchart illustrating a method of inputting a command according to one exemplary embodiment. Referring to FIG. 17, the user may move the movable manipulation unit 200 by applying a predetermined force to the movable manipulation unit 200 (s600), or may move the movable manipulation unit 200 by manipulating the movement command input unit 410 provided to, for example, the steering wheel 400 (s610). When the movable manipulation unit 200 is moved by a user, the user may apply pressure to the movable manipulation unit 200 in a predetermined direction to move the movable manipulation unit 200 in the predetermined direction. In particular, the movable manipulation unit 200 may be moved manually or semi-automatically (s601). When the movable manipulation unit 200 is moved using the movement command input unit 410, the user may manipulate the movement command input unit 410, and the movable manipulation unit 200 may be configured to automatically move in a predetermined direction according to user manipulation (s611). According to one exemplary embodiment, the movement command input unit 410 may be configured to receive an input of a movement direction of the movable manipulation unit 200.

Particularly, the movable manipulation unit 200 may be configured to continue to move for a time for which the user manipulated the movement command input unit 410. According to another exemplary embodiment, the movement command input unit 410 may be configured to receive inputs of both movement direction and movement distance. Once movement of the movable manipulation unit 200 is completed (s620), the controller 20 may be configured to determine whether the movable manipulation unit 200 has reached a selectable position of a plurality of selectable positions (s630). The controller 20 may further be configured to determine an application according to the selectable position that the movable manipulation unit 200 has reached (s640), and produce a corresponding control signal. The movable manipulation unit 200 may be configured to execute an operation related to the selected application according to the control signal from the controller 20.

For example, the movable manipulation unit 200 may be configured to display various manipulation buttons and a map, or output various types of sound. In a method of inputting a command according to one exemplary embodiment, in response to detecting a user manipulation of the command input unit 220 of the movable manipulation unit 200, the command input unit 220 may be configured to output a predetermined signal and transfer the output signal to the controller 20. Then, the controller 20 may be configured to analyze the signal output from the command input unit 220 according to the selected application and output a relevant control command. Thereby, the movable manipulation unit 200 may be configured to operate according to the control command.

As is apparent from the above description, an input apparatus, a method of inputting a command, and a vehicle equipped with the input apparatus according to one exemplary embodiment allow a user to more easily input various commands as desired. An input apparatus, a method of inputting a command, and a vehicle according to one exemplary embodiment allow the user to more easily and more accurately input desired commands without checking visual information to perform manipulation.

An input apparatus, a method of inputting a command, and a vehicle according to one exemplary embodiment allow the user to more simply determine whether a desired command has been correctly input. In addition, an input apparatus, a method of inputting a command, and a vehicle according to one exemplary embodiment allow the user to change functions performed according to inputs in a desired manner. Accordingly, various functions may be provided according to the user's nature or habit. A vehicle according to one exemplary embodiment allows the user to more quickly and safely input various commands for implementation of various functions provided by the vehicle even when the vehicle is traveling, without a risk of being visually distracted. Accordingly, risk of vehicle accident during travel may be reduced.

Although a few exemplary embodiments of the present invention have been shown and described, it would be appreciated by those skilled in the art that changes may be made to the exemplary embodiments without departing from the principles and spirit of the invention, the scope of which is defined in the claims and their equivalents.

What is claimed is:

1. An input apparatus for a vehicle, the input apparatus comprising:
  a base frame embedded in a dashboard of the vehicle, wherein the base frame includes recessed areas disposed opposite of each other formed by concavely deforming a portion of the base frame, such that inner side surfaces of the recessed areas face each other;
  a movable manipulator installed at the base frame to be movable on a front surface of the dashboard and configured to move to at least one selectable position of a plurality of selectable positions along the front surface of the dashboard, wherein the at least one selectable position of the plurality of selectable positions corresponds to a position defined by the recessed areas;
  a controller configured to select an application to be executed according to the at least one selectable position to which the movable manipulator has moved and to control operation of the movable manipulator to execute an operation that corresponds to the selected application; and
  a display installed on the movable manipulator and configured to display different screens according to the selected application,
  wherein an entirety of the display is exposed while the movable manipulator linearly moves the display in an up-or-down direction.

2. The input apparatus according to claim 1, wherein the selected application includes at least one application selected from a group consisting of: a navigation application, a radio application, a multimedia reproduction application, a telephone-call application, a digital media broadcasting application, an air conditioning system application, and a vehicle control application.

3. The input apparatus according to claim 1, wherein the movable manipulator includes a command inputter configured to output a signal that corresponds to a user manipulation.

4. The input apparatus according to claim 3, wherein the command inputter includes at least one selected from a group consisting of: a physical button, a knob, a joystick, a lever, a trackball, a manipulation wheel, a touch sensor, a motion sensor, and an object detection sensor.

5. The input apparatus according to claim 3, wherein the controller is configured to analyze the signal output from the command inputter according to the selected application.

6. The input apparatus according to claim 1, wherein the controller is configured to select the application with reference to predetermined settings, wherein the predetermined settings include a user defined setting.

7. The input apparatus according to claim 1, further comprising: a position determiner configured to determine a selectable position of the plurality of selectable positions at which the movable manipulator is located.

8. The input apparatus according to claim 1, wherein the movable manipulator is moved manually, semi-automatically, or automatically according to a user manipulation.

9. The input apparatus according to claim 1, further comprising: a movement command inputter configured to receive a command to move or stop the movable manipulator.

10. The input apparatus according to claim 9, wherein the movement command inputter includes at least one selected from a group consisting of: a physical button, a knob, a joystick, a lever, a trackball, a manipulation wheel, a touch sensor, a motion sensor, and an object detection sensor.

11. The input apparatus according to claim 1, further comprising:
  a fixer configured to fix the movable manipulator to the at least one selectable position.

12. The input apparatus according to claim 11, wherein the fixer includes:
  a first frame having at least one protrusion; and
  a second frame movable relative to the first frame and including at least one groove allowing the least one protrusion to be inserted into or separated from the groove.

13. A method of inputting a command using an input apparatus for a vehicle, the method comprising:
  moving, by a controller, a movable manipulator installed at a base frame embedded in a dashboard of the vehicle to at least one selectable position of a plurality of selectable positions along a front surface of the dashboard, wherein the base frame includes recessed areas disposed opposite of each other formed by concavely deforming a portion of the base frame, such that inner side surfaces of the recessed areas face each other, and wherein the at least one selectable position of the plurality of selectable positions corresponds to a position defined by the recessed areas;

determining, by the controller, the at least one selectable position to which the movable manipulator has moved;

selecting, by the controller, an application to be executed according to the at least one selectable position; and displaying, by a display installed on the movable manipulator, different screens according to the selected application, wherein an entirety of the display is exposed while the movable manipulator linearly moves the display in an up-or-down.

14. The method according to claim 13, further comprising:

outputting, by the controller, a signal that corresponds to a user manipulation;

analyzing, by the controller, the output signal according the selected application; and operating, by the controller, the movable manipulator based on a result of the analyzing of the output signal.

15. A vehicle, comprising:

a base frame embedded in a dashboard of the vehicle and provided with a plurality of selectable positions, wherein the base frame includes recessed areas disposed opposite of each other formed by concavely deforming a portion of the base frame, such that inner side surfaces of the recessed areas face each other;

a movable manipulator installed at the base frame to be movable on a front surface of the dashboard and configured to move to at least one selectable position of the plurality of selectable positions along the front surface of the dashboard, wherein the at least one selectable position of the plurality of selectable positions corresponds to a position defined by the recessed areas;

a controller configured to select an application to be executed according to the at least one selectable position to which the movable manipulator has moved and to control operation of the movable manipulator to execute an operation that corresponds to the selected application; and a display installed on the movable manipulator and configured to display different screens according to the selected application, wherein an entirety of the display is exposed while the movable manipulator linearly moves the display in an up-or-down direction.

16. The vehicle according to claim 15, further comprising:

a movement command inputter configured to receive a command to move or stop the movable manipulator.

17. The vehicle according to claim 16, wherein the movement command inputter is installed on at least one of a gear box, a center fascia, and a steering wheel.

18. A non-transitory computer readable medium containing program instructions executed by a controller, the computer readable medium comprising:

program instructions for moving a movable manipulator installed at a base frame embedded in a dashboard of a vehicle to at least one selectable position of a plurality of selectable positions along a front surface of the dashboard, wherein the base frame includes recessed areas disposed opposite of each other formed by concavely deforming a portion of the base frame, such that inner side surfaces of the recessed areas face each other, and wherein the at least one selectable position of the plurality of selectable positions corresponds to a position defined by the recessed areas;

program instructions for determining the at least one selectable position to which the movable manipulator has moved;

program instructions for selecting an application to be executed according to the at least one selectable position; and program instructions for displaying via a display installed on the movable manipulator different screens according to the selected application, wherein an entirety of the display is exposed while the movable manipulator linearly moves the display in an up-or-down direction.

19. The non-transitory computer readable medium of claim 18, further comprising:

program instructions for outputting-a signal that corresponds to a user manipulation;

program instructions for analyzing the output signal according to the selected application; and program instructions for operating the movable manipulator based on a result of the analyzed output signal.

* * * * *